United States Patent
Suzuki et al.

(10) Patent No.: US 12,532,062 B2
(45) Date of Patent: Jan. 20, 2026

(54) IMAGING DEVICE

(71) Applicant: DENSO CORPORATION, Kariya (JP)

(72) Inventors: Yoshihiro Suzuki, Kariya (JP); Shunya Yamamori, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/645,234

(22) Filed: Apr. 24, 2024

(65) Prior Publication Data

US 2024/0364994 A1  Oct. 31, 2024

(30) Foreign Application Priority Data

Apr. 26, 2023  (JP) ................. 2023-072618

(51) Int. Cl.
*H04N 23/57* (2023.01)
*B60R 11/04* (2006.01)
*H04N 23/51* (2023.01)
*H01R 13/73* (2006.01)

(52) U.S. Cl.
CPC ............ *H04N 23/57* (2023.01); *B60R 11/04* (2013.01); *H04N 23/51* (2023.01); *H01R 13/73* (2013.01)

(58) Field of Classification Search
CPC ........ H04N 23/57; H04N 23/51; B60R 11/04; H01R 13/73
USPC .......................................... 348/148
See application file for complete search history.

(56) References Cited

U.S. PATENT DOCUMENTS

| 2004/0067054 A1* | 4/2004 | Ichikawa ............... G03B 17/02 |
| | | 396/448 |
| 2005/0225666 A1* | 10/2005 | Katakai .............. H04N 1/00912 |
| | | 348/E5.042 |
| 2013/0077954 A1* | 3/2013 | Oikawa ................ G03B 17/565 |
| | | 396/530 |

(Continued)

FOREIGN PATENT DOCUMENTS

JP  2018-069878 A  5/2018

*Primary Examiner* — Matthew David Kim
(74) *Attorney, Agent, or Firm* — Maschoff Brennan

(57) ABSTRACT

An imaging device is provided which includes a camera module, a case, a cover, a board, a terminal, and a connector housing. The camera module includes a holder in which a lens is disposed and an image sensor which captures an image in response to light having passed through the lens and outputs it in the form of an electrical signal. The cover 45 defines an inner chamber along with the case in which the lens and, the holder 256, and the image sensor are disposed. The board obtains the electrical signal from the image sensor. The terminal connects with the board to achieve transmission of the electrical signal therebetween. The connector housing has the terminal disposed therein. The holder includes a holder body and a flange. The holder body has light, as having passed through the lens, travel therein. The holder body is arranged adjacent to the connector housing in a first direction. The flange extends in the first direction from a portion of the holder body which faces the connector housing. The flange is secured to the case. If the flange is projected onto a plane in a direction perpendicular both to a direction in which an optical axis of the lens extends and the first direction, the connector housing overlaps the flange. This structure enables the overall size of the imaging device to be reduced.

8 Claims, 5 Drawing Sheets

(56) References Cited

U.S. PATENT DOCUMENTS

| | | | |
|---|---|---|---|
| 2015/0222804 A1* | 8/2015 | Imamura | G03B 17/18 |
| | | | 348/360 |
| 2016/0268716 A1* | 9/2016 | Conger | H01R 12/716 |
| 2018/0255213 A1* | 9/2018 | Ahn | B60R 11/04 |
| 2019/0387157 A1* | 12/2019 | Chen | H04N 23/45 |
| 2020/0142280 A1* | 5/2020 | Chen | H05K 1/18 |
| 2020/0236266 A1* | 7/2020 | Krammer | H04N 23/52 |
| 2021/0103119 A1* | 4/2021 | Reckker | H04N 23/51 |
| 2022/0026706 A1* | 1/2022 | Xu | H04N 23/54 |
| 2022/0234518 A1* | 7/2022 | Sesti | H04N 23/51 |
| 2023/0199291 A1* | 6/2023 | Hwang | H04N 23/50 |
| | | | 348/374 |

\* cited by examiner

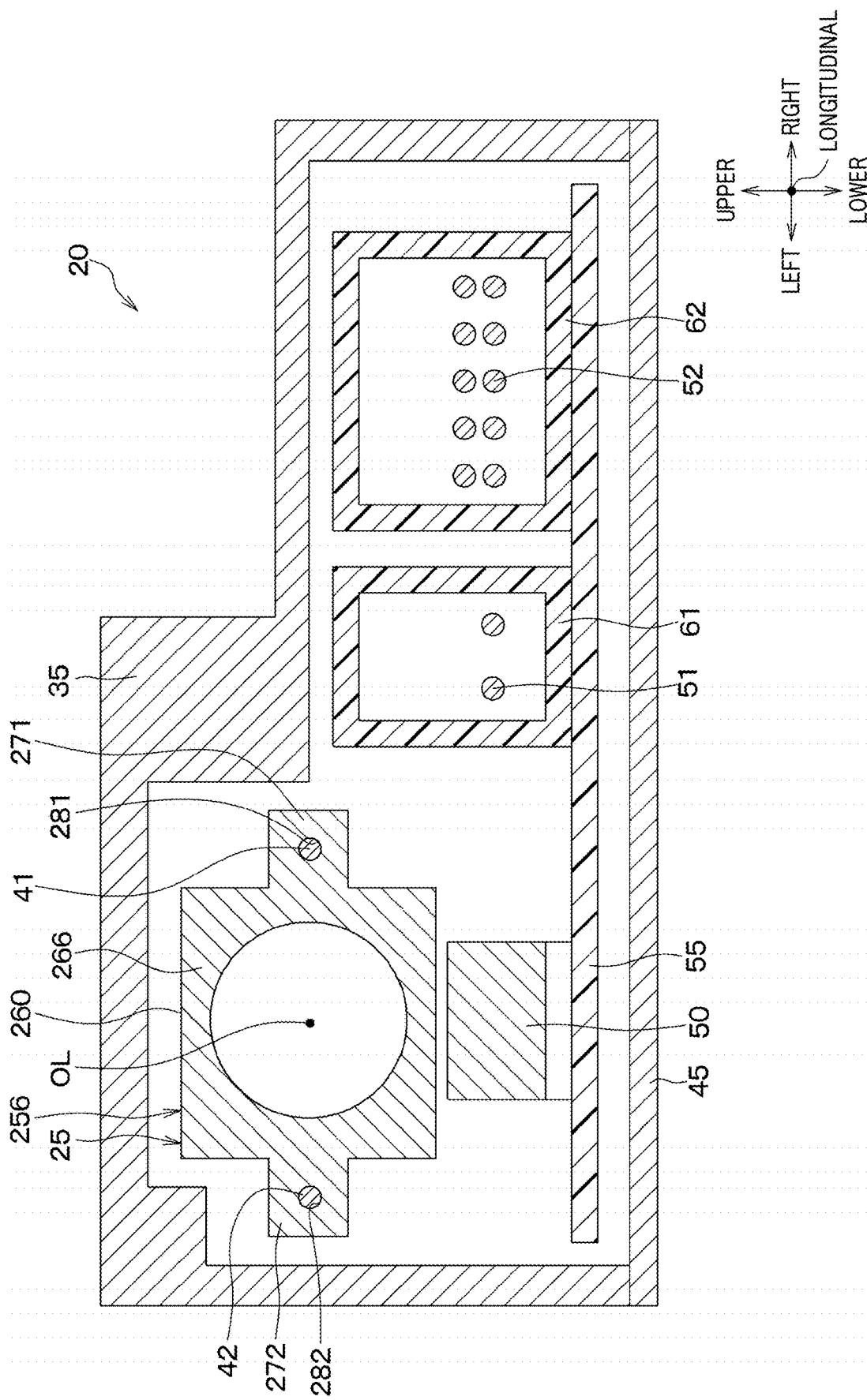

IMAGING DEVICE

CROSS REFERENCE TO RELATED DOCUMENT

The present application claims the benefit of priority of Japanese Patent Application No. 2023-072618 filed on Apr. 26, 2023, the disclosure of which is incorporated in its entirety herein by reference.

TECHNICAL FIELD

This disclosure relates generally to an imaging device.

BACKGROUND ART

Japanese First Publication No. 2018-69878 discloses an imaging device in the form of a vehicle-mounted camara device which includes a camera, a connector connecting with accessories attached to the camera through a communication line, and a bracket retaining the camera and the connector. The vehicle-mounted camera device includes a member which is attached to the camera and has an end surface from which the communication line extends. The connector is arranged adjacent to the end surface of the member and has a lower end from which the communication line extends. When viewed in a widthwise direction of the vehicle, the lower end of the connector overlaps the camera.

The above vehicle-mounted camera device is, as described above, designed to have the camera and the connector which are arranged adjacent each other in the width-wise direction of the vehicle, thereby resulting in an increase in size of a body of the vehicle-mounted camera device, which may result in disadvantages to the design or installation of the vehicle-mounted camara device on the vehicle.

SUMMARY

It is, therefore, a principal object of this disclosure to provide an imaging device capable of having a reduced size.

According to one aspect of this disclosure, there is provided an imaging device which comprises: (a) a camera module which includes a lens, a holder in which the lens is disposed, and an image sensor which captures an image using light having passed through the lens and outputs the captured image in a form of an electrical signal; (b) a case; (c) a cover which defines an inner chamber along with the case in which the lens, the holder, and the image sensor are disposed; (d) a board which derives the electrical signal from the image sensor; (e) a terminal which is connected to the board and through which an electrical signal is transmitted; and (f) a connector housing in which the terminal is disposed. The holder includes a holder body and a flange. The holder body is of a hollow shape in which light, as having passed through the lens, travels and is arranged adjacent to the connector housing in a first direction. The flange extends in the first direction from a portion of the holder body which faces the connector housing. The flange is secured to the case. If the flange is projected onto a plane in a direction perpendicular both to a direction in which an optical axis of the lens extends and to the first direction, the connector housing overlaps the flange.

The above layout of the connector housing and the flange, i.e., the overlap therebetween enables the imaging device to have a size reduced in the first direction as compared with when the connector housing and the flange are arranged out of alignment or not to overlap with each other in the first direction.

In this disclosure, reference numbers or symbols in brackets represent correspondence relations to elements discussed in embodiments, as described below.

BRIEF DESCRIPTION OF THE DRAWINGS

The present disclosure will be understood more fully from the detailed description given hereinbelow and from the accompanying drawings of the preferred embodiment of the invention, which, should not be taken to limit the invention to the specific embodiment but are for the purpose of explanation and understanding only.

In the drawings:

FIG. 5 is a cross sectional view which illustrates a comparative example of an imaging device.

DESCRIPTION OF THE PREFERRED EMBODIMENTS

The embodiments will be described below with reference to the drawings. Parts of the embodiments functionally or structurally corresponding to each other or associated with each other will be denoted by the same reference numbers for the brevity of explanation.

The imaging device 20 in this embodiment is designed to enable the size thereof to be reduced. The imaging device 20 is used with, for example, vehicles, such as automobiles. One of such a type of vehicles will first be described below.

Figure 1:
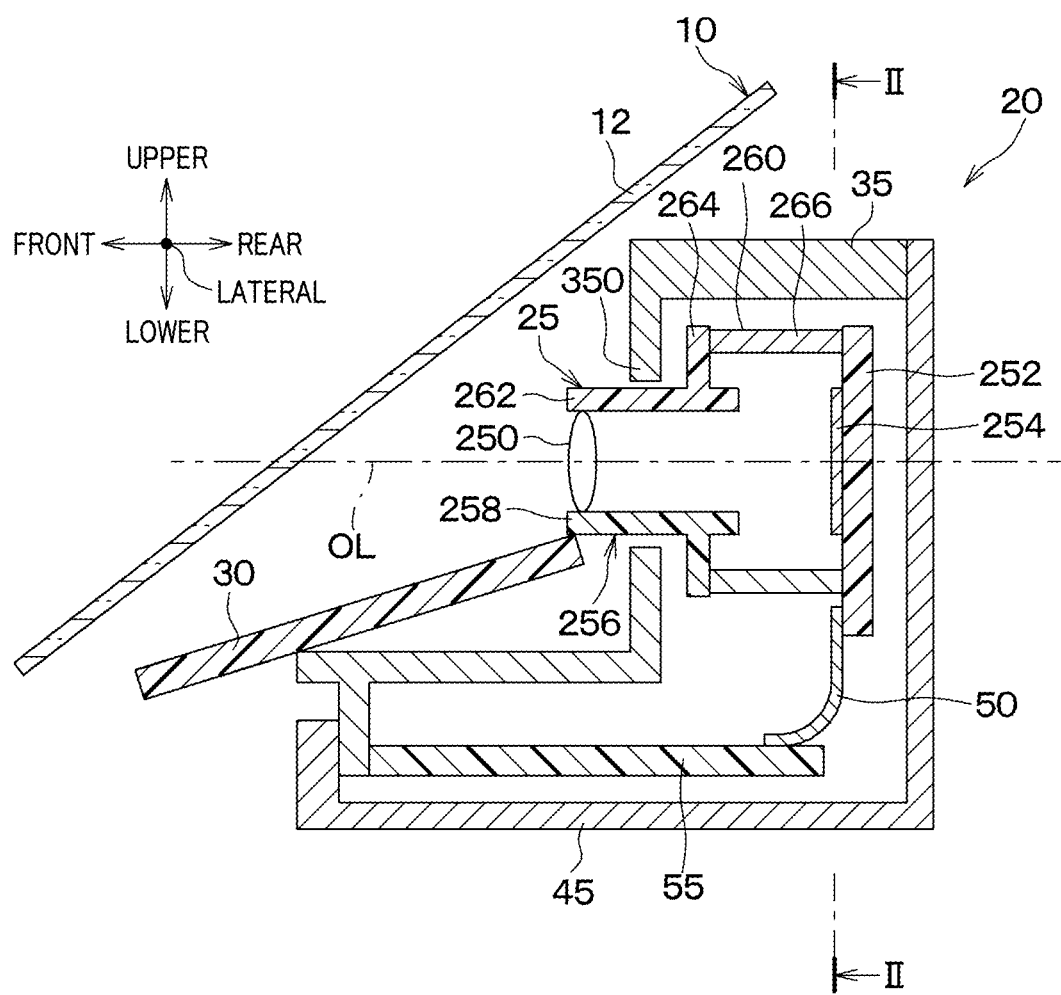
FIG. 1 is a cross sectional view of an imaging device according to an embodiment.

The vehicle 10, as illustrated in FIG. 1, includes the windshield 12 and the imaging device 20. The windshield 12 is used for a driver of the vehicle 10 to secure a field of vision in front of the vehicle 10.

The imaging device 20 is implemented by, for example, a monocular camera working to capture an image of a frontward view in front of the vehicle 10. The imaging device 20 may alternatively be implemented by a compound eye camera. The imaging device 20 may alternatively be arranged to capture an image of a surround view, such as a side view on the right or left side of the vehicle 10 or a rearward view in the rear of the vehicle 10.

The imaging device 20, as illustrated in FIGS. 1 to 4, includes the camera module 25, the hood 30, the case 35, the first fastener 41, the second fastener 42, the cover 45, and the board-to-board connecting member 50. The imaging device 20 also includes the first terminals 51, the second terminals 52, the processor board 55, the first connector housing 61, and the second connector housing 62.

The camera module 25 includes the lens 250, the imaging board 252, the image sensor 254, and the holder 256.

The lens 250 works to collect rays of light from outside the front of the vehicle 10 for capturing an image of the frontward view in front of the vehicle 10. The lens 250 has the optical axis OL extending in the longitudinal direction of the vehicle 10.

The imaging board 252 is made of a printed-circuit board. The image sensor 254 is made of a semiconductor image sensor, such as a CMOS image sensor. The image sensor 254 is mounted on a surface of the imaging board 252 which faces the lens 250 in the longitudinal direction of the vehicle 10, so that the image sensor 254 captures light having passed through the lens 250 and converts it to create and output an image in the form of an electrical signal.

The holder 256 includes the lens holder 258 and the connecting holder member 260. The lens holder 258 is made from resin. The lens holder 258 includes the lens holder body 262 and the lens holder flange 264.

The lens holder body 262 is of a hollow column-shape and has the lens 250 disposed therein. The lens holder flange 264 extends from the lens holder body 262 in a direction perpendicular, e.g., orthogonal to the optical axis OL.

The connecting holder member 260 is made from a metallic material, such as aluminum, which is light in weight and high in mechanical strength and thermal conductivity. The connecting holder member 260 includes the connecting holder body 266, the first flange 271, and the second flange 272.

Figure 2:
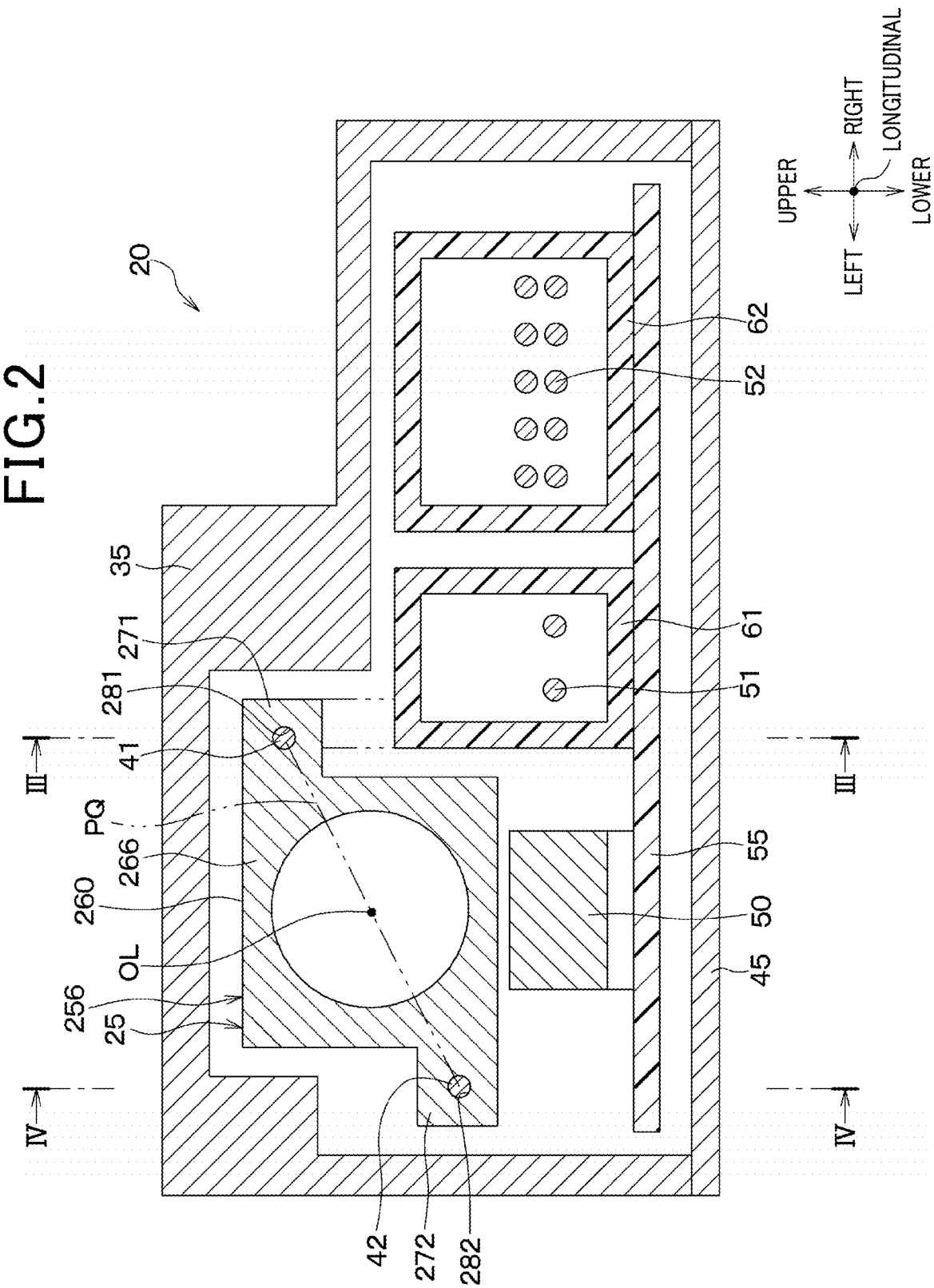
FIG. 2 is a cross sectional view taken along the line II-II in FIG. 1.

The connecting holder body 266 is, as can be seen in FIG. 2, of a hollow column shape having a square outer periphery in cross section and a circular inner periphery in cross section to define a cylindrical inner chamber through which light is permitted to pass. The connecting holder body 266, as illustrated in FIG. 1, has a front end which faces the frontward view in front of the vehicle 10 and is attached using adhesive or screws to a portion of the lens holder flange 264 facing in the longitudinal direction of the vehicle 10. The connecting holder body 266 also has a rear end which faces the rear of the vehicle 10 and is attached using adhesive or screws to a portion of the imaging board 252 facing in the longitudinal direction of the vehicle 10. Light, as having passed through the lens 250, travels within the connecting holder body 266 and then enters the image sensor 254.

Figure 3:
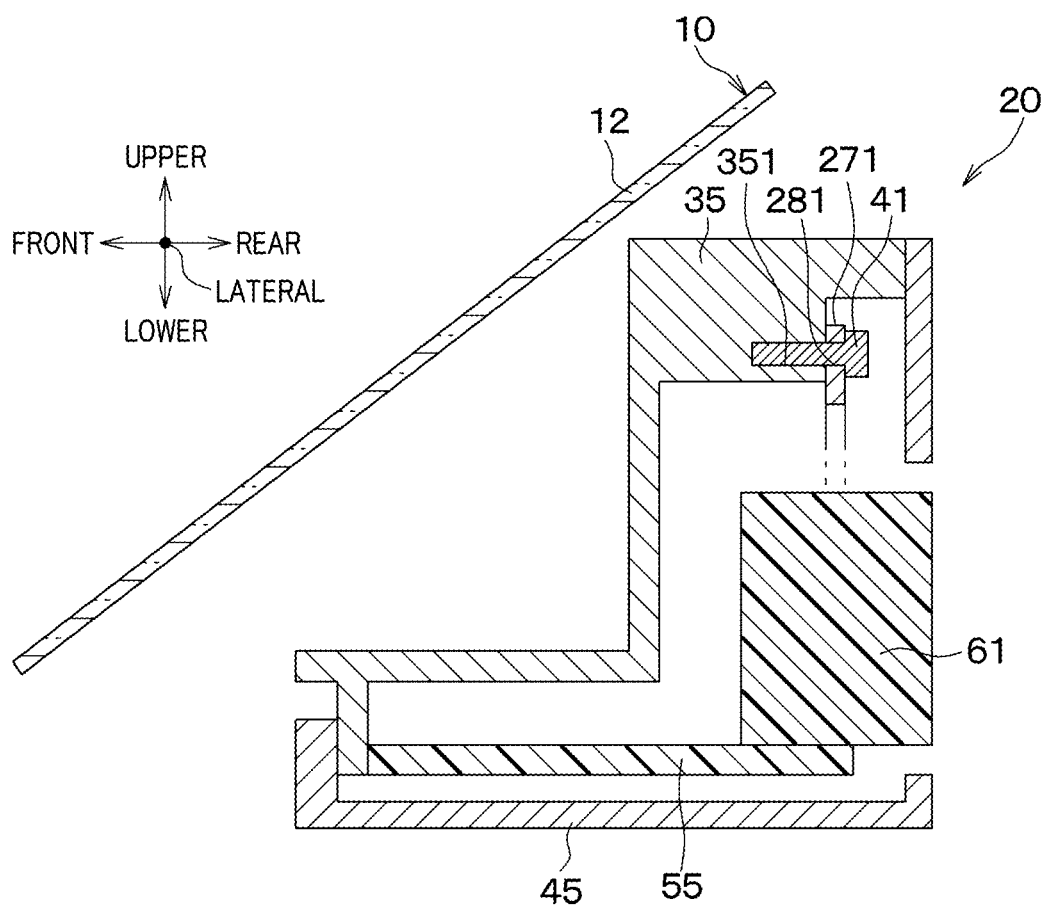
FIG. 3 is a cross sectional view taken along the line III-III in FIG. 2.

The first flange 271, as can be seen in FIG. 2, extends in the rightward direction of the vehicle 10 from a first portion of the connecting holder body 266 which is located close to the first connector housing 61 (which will described later in detail). The first flange 271, as illustrated in FIGS. 2 and 3, has formed therein the first flange hole 281 extending in the longitudinal direction of the vehicle 10.

Figure 4:
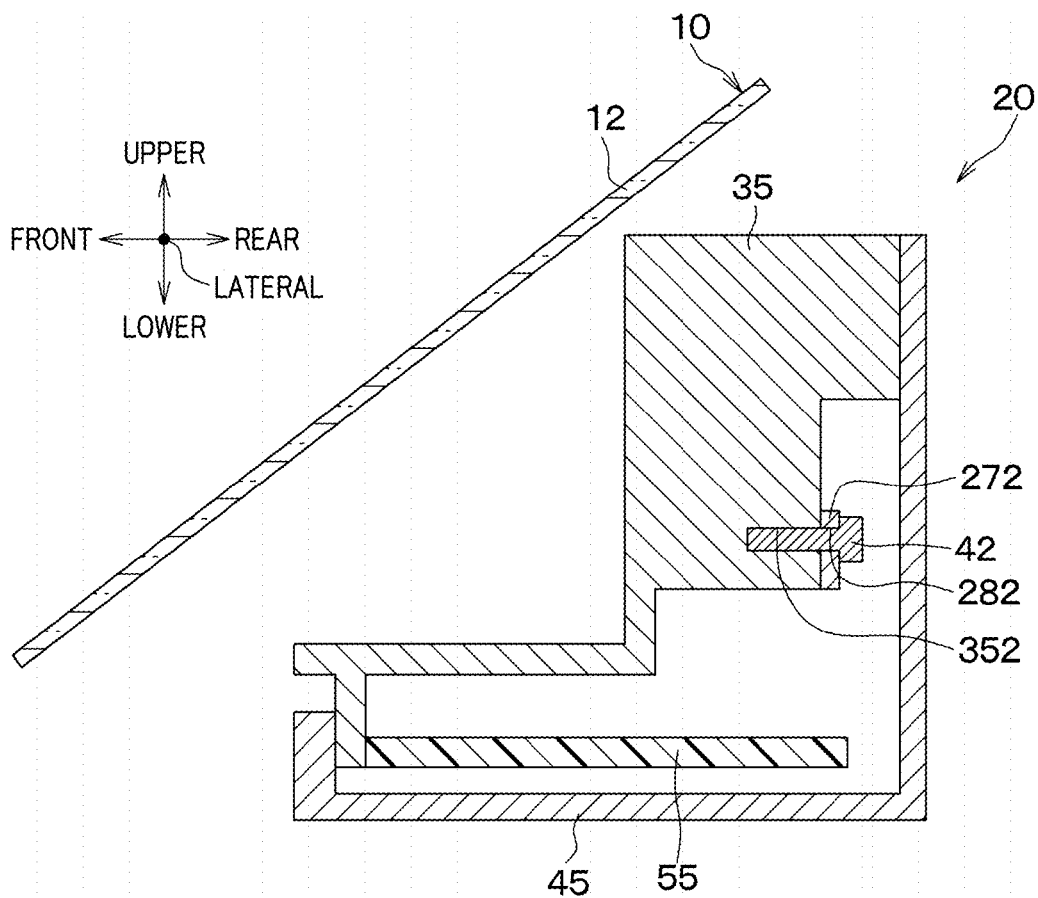
FIG. 4 is a cross sectional view taken along the line IV-IV in FIG. 2.

The second flange 272, as illustrated in FIG. 2, extends from a second portion of the connecting holder body 266 located away from the first portion from which the first flange 271 extends. In other words, the second flange 272 extends away from the first flange 271 in the leftward direction of the vehicle 10. The second flange 272, as illustrated in FIGS. 2 and 4, has formed therein the second flange hole 282 which extends in the longitudinal direction of the vehicle 10. A line segment PQ, as illustrated in FIG. 2, which straight extends between the center of the first flange 271 and the center of the second flange 272 passes through or traverses the optical axis OL. A distance between the processor board 55 and the first flange 271 in the vertical direction of the vehicle 10 is longer than that between the processor board 55 and the second flange 272 in the vertical direction of the vehicle 10.

The hood 30 is, as illustrated in FIG. 1, arranged on a portion of the lens holder 258 which is located below the front of the vehicle 10. The hood 30 is of a plate-like shape made from a black antireflective material or plastic to block entry of light, as coming from below the imaging device 20 in the vehicle 10 or inside the vehicle 10, into the lens 250.

The case 35 illustrated in FIGS. 1 to 4 is made from a metallic material, such as aluminum, which is light in weight and high in mechanical strength and thermal conductivity. The case 35 has the opening 350, the first case hole 351, and the second case hole 352 formed therein.

The lens holder body 262, as can be seen in FIG. 1, has a portion inserted into the opening 350 of the case 35.

The first case hole 351, as can be seen in FIG. 3, extends in the longitudinal direction of the vehicle 10 in alignment with the first flange hole 281. In other words, the first case hole 351 communicates with the first flange hole 281.

The second case hole 352, as can be seen in FIG. 4, extends in the longitudinal direction of the vehicle 10 in alignment with the second flange hole 282. In other words, the second case hole 352 communicates with the second flange hole 282.

The first fastener 41 is implemented by a screw which is, as illustrated in FIG. 3, inserted into the first flange hole 281 and the first case hole 351. Similarly, the first fastener 42 is implemented by a screw which is, as illustrated in FIG. 4, inserted into the second flange hole 282 and the second case hole 352. This achieves a mechanical joint between the case 35 and the lens holder 258, thereby securing the case 35 and the camera module 25 to each other. The joint of the case 35 and the camera module 25 may alternatively be achieved using adhesive or by interlocking a convex and a concave part with each other which are formed on and in the case 35 and the camera module 25 instead of the first fastener 41 and the second fastener 42.

The cover 45 illustrated in FIGS. 1 to 4 is made from a metallic material, such as aluminum, which is light in weight and high in mechanical strength and thermal conductivity. The cover 45 defines an inner chamber along with the case 35 in which the camera module 25 is disposed. The cover 45 is secured to the case 35 and the imaging board 252 using, for example, screws.

The board-to-board connecting member 50 is made of, for example, an FPC (i.e., flexible printed circuit) and, as illustrated in FIGS. 1 and 2, disposed in the inner chamber defined by the case 35 and the cover 45. The board-to-board connecting member 50 also connects with the imaging board 252 and the processor board 55 which will be described later in detail.

The first terminals 51 and the second terminals 52 connect with a power supply not shown, a display not shown, an interface leading to an external server not shown, a driver assistance system not shown, and a driver's condition monitoring system not shown. The first terminals 51 and the second terminals 52 are connected using solder to the processor board 55 which will be described later in detail. The first terminals 51 and the second terminals 52 also achieve transmission of electrical signals between themselves and each of the power supply, the display, the interface leading the external server, the driver assistance system, the driver's condition monitoring system, and the processor board 55.

The processor board 55 is made of a printed circuit board and disposed in the inner chamber defined by the case 35 and the cover 45. The processor board 55 has a microcomputer, a ROM, a RAM, etc., mounted thereon. The microcomputer on the processor board 55 operates on electrical power delivered from a power supply not shown. The microcomputer on the processor board 55 also works to execute a program stored in the ROM to obtain an image captured by the image sensor 254 in the form of an electrical signal through the imaging board 252 and the board-to-board connecting member 50.

Specifically, the microcomputer on the processor board 55 instructs the not-shown display to display the captured image. The microcomputer also processes the captured image using image recognition techniques. The microcomputer also outputs the captured image and results of the processing of the captured image in the form of electrical signals to the interface leading to the external server not shown and the not-shown driver assistance system using the first terminals 51 or the second terminals 52.

The not-shown interface obtains the electrical signals indicative of the captured image and the results of the processing of the captured image and outputs them to the external server. The external server stores therein data on the captured image and the results of the processing of the captured image.

The not-shown driver assistance system obtains the signals indicative of the results of the processing of the captured image to perform driver's assistance tasks, such as an alarm output control and an operation control of the vehicle 10. The alarm output control is a system serving to sound an alarm when the driver in the vehicle 10 is likely or expected to depart its lane. The operation control of the vehicle 10 is a system serving to perform a steering control task or a braking control task to keep the vehicle 10 traveling within the lane.

The microcomputer on the processor board 55 also executes a program stored in the ROM to obtain a condition of the driver from the driver's condition monitoring system not shown and then performs an image recognition task to process the captured image using the condition of the driver. For instance, when the driver is unconscious, so that the driver is unable to operate the vehicle 10, the microcomputer on the processor board 55 analyzes the captured image to search for a place where the vehicle 10 can be parked in safety. The microcomputer also outputs the searched place in the form of an electrical signal to the driver assistance system not shown using the first terminals 51 or the second terminals 52. The driver assistance system receives the signal outputted from the microcomputer to move and park the vehicle 10 at the searched place.

The first connector housing 61 is, as can be seen in FIGS. 2 and 3, made from resin into a hollow column with a bottom and has the first terminals 51 disposed therein. The first connector housing 61 is firmly secured to the processor board 55. The first connector housing 61 is arranged adjacent to the connecting holder body 266 in the lateral direction of the vehicle 10.

When the first flange 271 is projected onto a plane in a direction perpendicular both to a direction in which the optical axis OL extends and to a direction in which the first connector housing 61 and the connecting holder body 266 are arranged adjacent to each other, that is, the vertical direction of the vehicle 10, the first connector housing 61 is viewed to overlap the first flange 271.

The second connector housing 62 is, as can be seen in FIG. 2, made from resin into a hollow column with a bottom and has the second terminals 52 disposed therein. The second connector housing 62 is firmly secured to the processor board 55. The connecting holder body 266, the first connector housing 61, and the second connector housing 62 are arranged adjacent to each other in the lateral direction of the vehicle 10. The first connector housing 61 is disposed between the connecting holder body 266 and the second connector housing 62 in the lateral direction of the vehicle 10.

The vehicle 10 equipped with the imaging device 20 is designed to have the above-described structure. How to avoid an increase in size of the imaging device 20 will be described below.

For instance, if the connecting holder body 266, the first flange 271, and the first connector housing 61 of the camera module 25 are, as demonstrated in FIG. 5, arranged adjacent to each other in the lateral direction of the vehicle 10, it will result in an increased overall size of the imaging device 20.

In order to alleviate the above problem, the imaging device 20 in this embodiment is, as illustrated in FIG. 2, designed to have the connecting holder member 260 made up of the connecting holder body 266 and the first flange 271. The connecting holder body 266 is of a hollow column shape to have light, as emerging from the lens 250, travel therein. The connecting holder body 266 is arranged adjacent to the first connector housing 61 in the first direction, that is, the lateral direction of the vehicle 10. The first direction, as referred to therein, is a direction crossing both the longitudinal direction and the vertical direction of the vehicle 10. When the first flange 271 is projected onto a plane in a direction perpendicular to the optical axis OL and also to a direction in which the first connector housing 61 and the connecting holder body 266 are arranged adjacent to each other, that is, the vertical direction of the vehicle 10, the first connector housing 61 appears to overlap the first flange 271. In other words, the first connector housing 61 is partially aligned with the first flange 271 in the vertical direction of the vehicle 10 without any physical interference therebetween.

The above layout of the first connector housing 61 and the first flange 271, i.e., the overlap therebetween enables the imaging device 20 to have a size reduced in the first direction (i.e., the vertical direction of the vehicle 10) as compared with when the first connector housing 61 and the first flange 271 are arranged out of alignment or not to overlap with each other in the first direction. This enables the overall size of the imaging device 20 to be reduced.

The imaging device 20 in this embodiment offers the following beneficial advantages.

1) The line segment PQ extending between the first flange 271 and the second flange 272, as illustrated in FIG. 2, lines on the optical axis OL.

Due to dimensional errors or misalignment of the first flange 271 and the second flange 272 with each other in a direction in which the optical axis OL extends, the line segment PQ may rotate around an axis defined to extend along the line segment PQ or an axis defined to extend perpendicular to the line segment PQ and the optical axis OL. Such rotational movement of the line segment PQ will cause the optical axis OL to turn or shift. This results in an undesirable angular shift (i.e., a shift of pitch angle) of the optical axis OL around the axis defined to extend along the line segment PQ or an undesirable angular shift (i.e., a shift of yaw angle) of the optical axis OL around the axis defined to extend perpendicular to the line segment PQ and the optical axis OL. In order to alleviate the above drawbacks, this embodiment is designed to have the line segment PQ lying on the optical axis OL, thereby minimizing the shifts of pitch angle and yaw angle as compared with wen the line segment PQ is geometrically located outside the optical axis OL. This ensures the stability in orientation of the optical axis OL, thus minimizing a deviation of an imaging range of the imaging device 20 from a required one.

2) The distance between the processor board 55 and the first flange 271 in the vertical direction of the vehicle 10 is greater than that between the processor board 55 and the second flange 272 in the vertical direction of the vehicle 10.

The above layout results in a relative increase in interval between the processor board 55 and the first flange 271, thereby facilitating the ease with which the first connector housing 61 is arranged between the processor board 55 and the first flange 271 to create an overlap of the first connector housing 61 with the first flange 271 as viewed in the vertical direction of the vehicle 10. This enables the overall size of the imaging device 20 to be minimized.

3) The imaging device 20, as clearly illustrated in FIGS. 2 and 3, includes the first fastener 41. The first fastener 41 is inserted both into the first flange hole 281 and into the first case hole 351 to achieve a firm joint of the holder 256 and the case 35.

The use of the first fastener 41 ensures the stability in mechanical securement of the case 35 to the holder 256. This minimizes misalignment of the optical axis OL, thereby minimizing a deviation of the imaging range of the imaging device 20 from a required one.

4) The connecting holder body 266, the first connector housing 61, and the second connector housing 62 are, as clearly illustrated in FIG. 2, arranged in alignment with each other in the first direction, that is, the lateral direction of the vehicle 10. The first connector housing 61 is disposed between the connecting holder body 266 and the second connector housing 62 in the first direction.

The above layout increases ease of use of the imaging device 20 depending upon the intended use of the first terminals 51 and the second terminals 52 as compared with when the first connector housing 61 and the second connector housing 62 are located far away from each other.

OTHER EMBODIMENTS

This disclosure is not limited to the above embodiments, but may be realized by various embodiments without departing from the purpose of the disclosure. This disclosure includes all possible combinations of the features of the above embodiments or features similar to the parts of the above embodiments. The structures in this disclosure may include only one or some of the features discussed in the above embodiments unless otherwise inconsistent with the aspects of this disclosure.

The controllers or how to construct them referred to in this disclosure may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controllers or operations thereof referred to in this disclosure may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium.

The above embodiment uses the imaging device 20 in the vehicle 10, but however, the imaging device 20 may alternatively be installed in facilities.

In the above embodiment, the driver assistance system not shown analyzes the results of the processing of the captured image made by the microcomputer fabricated on the processor board 55 to perform the driver's assistance task, such as an alarm output control task or a vehicle operation control task in the vehicle 10, but however, may alternatively be designed to use an output from a Lidar (i.e., Light Detection and Ranging, Laser Imaging Detection and Ranging) installed in the vehicle 10 in addition to the results of the processing of the captured image made by the microcomputer on the processor board 55 to perform the driver's assistance task.

UNIQUE ASPECTS OFFERED BY THIS DISCLOSURE

First Aspect

An imaging device (20) is provided which comprises:
a camera module (25) which includes a lens (250), a holder (256) in which the lens is disposed, and an image sensor (254) which captures an image using light having passed through the lens and outputs the captured image in a form of an electrical signal;
a case (35);
a cover (45) which defines an inner chamber along with the case in which the lens, the holder, and the image sensor are disposed;
a board (55) which derives the electrical signal from the image sensor;
a terminal (51) which is connected to the board and through which an electrical signal is transmitted; and
a connector housing (61) in which the terminal is disposed.

The holder includes a holder body (266) and a flange (271), the holder body being of a hollow shape in which light, as having passed through the lens, travels, and is arranged adjacent to the connector housing in a first direction. The flange extends in the first direction from a portion of the holder body which faces the connector housing. The flange is secured to the case. If the flange is projected onto a plane in a direction perpendicular both to a direction in which an optical axis (OL) of the lens extends and to the first direction, the connector housing overlaps the flange.

Second Aspect

The imaging device is provided which is set forth in "FIRST ASPECT" and in which the flange is defined as a first flange, the holder also includes a second flange (272) which extends from a portion of the holder body away from the connector housing in a second direction opposite to the first direction in which the first flange extends, and a line segment (PQ) defined to pass through the first flange and the second flange lies on the optical axis of the lens.

Third Aspect

The imaging device is provided which is set forth in "SECOND ASPECT" and in which a distance between the board and the first flange in a third direction perpendicular both to the direction in which the optical axis extends and the first direction is greater than that between the board and the second flange in the third direction.

Fourth Aspect

The imaging device which is set forth in "FIRST ASPECT" or "SECOND ASPECT" and in which the flange has a flange hole (281) formed therein, and the case has formed therein a case hole (351) which communicates with the flange hole. The imaging device further comprises a fastener (41) which is inserted into the flange hole and the case hole to achieve a joint of the holder and the case.

Fifth Aspect

The imaging device which is set forth in "FIRST ASPECT" or "SECOND ASPECT" and in which the imaging device is installed in a vehicle (10), and the first direction is a direction crossing both a longitudinal direction and a vertical direction of the vehicle.

Sixth Aspect

The imaging device which is set forth in "FIRST ASPECT" or "SECOND ASPECT" and in which the terminal is defined as a first terminal, and the connector housing is defined as a first connector housing. The imaging device further comprises: (a) a second terminal (52) which connects with the board and through which an electrical signal is transmitted; and (b) a second connector housing (62) in which the second terminal is disposed. The holder body, the first connector housing, and the second connector housing are arranged adjacent to each other in the first direction. The first connector housing is disposed between the holder body and the second connector housing in the first direction.

What is claimed is:

1. An imaging device comprising:
    a camera module which includes a lens, a holder in which the lens is disposed, and an image sensor which captures an image using light having passed through the lens and outputs the captured image in a form of an electrical signal;
    a case;
    a cover which defines an inner chamber along with the case in which the lens, the holder, and the image sensor are disposed;
    a board which derives the electrical signal from the image sensor;
    a terminal which is connected to the board and through which an electrical signal is transmitted; and
    a connector housing in which the terminal is disposed, wherein
    the holder includes a holder body and a flange,
    the holder body being of a hollow shape in which light, as having passed through the lens, travels, and is arranged adjacent to the connector housing in a first direction, the flange extending in the first direction from a portion of the holder body which faces the connector housing, the flange being secured to the case,
    when the flange is projected onto a plane in a direction perpendicular both to a direction in which an optical axis (OL) of the lens extends and to the first direction, the connector housing overlaps the flange.

2. The imaging device as set forth in claim 1, wherein
    the flange is defined as a first flange,
    the holder also includes a second flange which extends from a portion of the holder body away from the connector housing in a second direction opposite to the first direction in which the first flange extends,
    a line segment (PQ) defined to pass through the first flange and the second flange lies on the optical axis of the lens.

3. The imaging device as set forth in claim 2, wherein
    a distance between the board and the first flange in a third direction perpendicular both to the direction in which the optical axis extends and the first direction is greater than that between the board and the second flange in the third direction.

4. The imaging device as set forth in claim 1, wherein
    the flange has a flange hole formed therein,
    the case has formed therein a case hole which communicates with the flange hole, and further comprising:
    a fastener which is inserted into the flange hole and the case hole to achieve a joint of the holder and the case.

5. The imaging device as set forth in claim 1, wherein
    the imaging device is installed in a vehicle,
    the first direction is a direction crossing both a longitudinal direction and a vertical direction of the vehicle.

6. The imaging device as set forth in claim 1, wherein
    the terminal is defined as a first terminal,
    the connector housing is defined as a first connector housing, and further comprising:
    a second terminal which connects with the board and through which an electrical signal is transmitted; and
    a second connector housing in which the second terminal is disposed, wherein
    the holder body, the first connector housing, and the second connector housing are arranged adjacent to each other in the first direction,
    the first connector housing is disposed between the holder body and the second connector housing in the first direction.

7. The imaging device as set forth in claim 1, wherein
    the connector housing comprises a hollow column shape, and
    the terminal is disposed within a hollow portion of the connector housing.

8. The imaging device as set forth in claim 1, wherein
    the connector housing is secured to the board.

* * * * *